United States Patent
Kelly et al.

(10) Patent No.: US 6,498,987 B1
(45) Date of Patent: Dec. 24, 2002

(54) SYSTEM AND METHOD FOR PROVIDING PERSONALIZED WEATHER REPORTS AND THE LIKE

(75) Inventors: Terence F. Kelly, Madison, WI (US); Grant H. Brohm, Madison, WI (US); Richard T. Daly, Madison, WI (US); Victor W. Marsh, Fitchburg, WI (US); John S. Moore, Middleton, WI (US); Brett A. Wilt, Madison, WI (US)

(73) Assignee: Weather Central, Inc., Madison, WI (US)

(*) Notice: Subject to any disclaimer, the term of this patent is extended or adjusted under 35 U.S.C. 154(b) by 0 days.

(21) Appl. No.: 09/547,195

(22) Filed: Apr. 12, 2000

(51) Int. Cl.[7] ............................................. G06F 169/00
(52) U.S. Cl. ............................................................ 702/3
(58) Field of Search .......................... 702/2, 3, 4; 342/26

(56) References Cited

U.S. PATENT DOCUMENTS

| | | | |
|---|---|---|---|
| 5,398,021 A | * 3/1995 | Moore | 340/5.28 |
| 5,555,446 A | * 9/1996 | Jasinski | 340/7.21 |
| 5,568,385 A | 10/1996 | Shelton | |
| 5,654,886 A | 8/1997 | Zereski, Jr. et al. | |
| 5,717,589 A | 2/1998 | Thompson et al. | |
| 5,790,953 A | * 8/1998 | Wang et al. | 455/417 |
| 5,848,378 A | 12/1998 | Shelton et al. | |
| 5,893,091 A | * 4/1999 | Hunt et al. | 707/10 |
| 5,983,227 A | 11/1999 | Nazem et al. | |
| 5,995,966 A | 11/1999 | Kii et al. | |
| 5,999,882 A | 12/1999 | Simpson et al. | |
| 6,018,699 A | 1/2000 | Baron, Sr. et al. | |
| 6,023,223 A | 2/2000 | Baxter, Jr. | |
| 6,360,172 B1 | 3/2002 | Burfeind et al. | |
| 2001/0030624 A1 | 10/2001 | Schwoegler | |

OTHER PUBLICATIONS

Weather Central Unveils A.D.O.N.I.S. Microcast. Business Wire, Apr. 5, 1999, p. 1334.

Mail.com Partners With Weather.com to Allow Members to Check Local Forecasts Through Their E-mail Accounts. Business Wire. Oct. 7, 1999, p. 1388.

Unwired Planet and Aldiscon Bring Internet Access to Mobile Phone Networks. Business Wire. May 13, 1997, p. 05130220.

New Internet News Agent Raises the Bar for Intelligent News Delivery. PR Newswire. Feb. 3, 1997, p. 0203SFM052.

(List continued on next page.)

*Primary Examiner*—Donald E. McElheny, Jr.
(74) *Attorney, Agent, or Firm*—Reinhart Boerner Van Deuren s.c.

(57) ABSTRACT

A system and method for generating weather reports and the like which are precisely computed automatically for a particular individual user's geographic location and which are provided automatically directly to the individual user. A user establishes an individualized user profile in which the user defines a particular location of interest, a contact address, and optionally, a personalized activity weather condition profile, establishing a preferred weather condition profile for activities of interest. A detailed and accurate weather forecasting model is run to provide high geographical and temporal resolution forecast data. The high resolution forecast data is compared to the individual user profile and a personalized weather report for the particular location, times, and conditions of interest are provided directly and automatically to the individual, e.g., via e-mail. The high resolution forecast data is preferably generated locally for a limited region, e.g., at a television station for the station's viewing area, using initialization conditions provided from a central location.

50 Claims, 5 Drawing Sheets

OTHER PUBLICATIONS

Wiltek, Inc. Lands First EnviroFAX Customer. Business Wire. Nov. 30, 1998, see paragraphs 4 and 5 in particular.

Hane, Paula. Web–based Access is the Highlight of 1996. Database. Dec. 1996, vol. 19, No. 6, p. 7.

Internet World Wide Web Page, http://www.weather.com/weather/cities/us_wi_mazomanie.html, printed Jan. 6, 1999.

Internet World Wide Web Page, http://www.weather.com/weather/us/zips/53562.html, printed Jan. 6, 1999.

Internet World Wide Web Page, http://www.usatoday.com/weather/basemaps/nw726410.htm, printed Jan. 6, 1999.

Internet World Wide Web Page, http://cirrus.sprl.umich.edu/wxnet/, printed Jan. 6, 1999.

Internet World Wide Web Page, http://www.intellicast.com/weather/usa/content.html, printed Jan. 6, 1999.

Internet World Wide Web Page, http://www.weatherimages.org/, printed Jan. 6, 1999.

Internet World Wide Web Page, http://www.earthwatch.com/, printed Jan. 6, 1999.

Internet World Wide Web Page, http://members.aol.com/mhasper/weather.html, printed Jan. 6, 1999.

Internet World Wide Web Page, http://www.accuweather.com/weatherf/index_corp, printed Jan. 6, 1999.

Internet World Wide Web Page, http://www.accuweather.com/weather . . .?zipcode=53560&partner=AccuWeather, printed Jan. 6, 1999.

Internet World Wide Web Page, http://direct.accuweather.com/, printed Jan. 11, 1999.

Internet World Wide Web Page, http://Direct.AccuWeather.com/ewxbin/main, printed Jan. 11, 1999.

Internet World Wide Web Page, http://personal.accuweather.com/we . . . B53562&partner=AccuWeather&metrix=, printed Jan. 11, 1999.

Internet World Wide Web Page, http://www.intellicast.com/weather/msn/content.shtml, printed Jan. 11, 1999.

Internet World Wide Web Page, http://www.wunderground.com/cgibi . . ./getForecast?query=Middleton%2C+WI, printed Jan. 11, 1999.

Internet World Wide Web Page, http://www.weather24.com/, printed Jan. 11, 1999.

Internet World Wide Web Page, http://www.weather24.com/local/find?weathernow=53562, printed Jan. 11, 1999.

\* cited by examiner-

User Profile Set Up

Name: Terry Kelly — 44    — 46

Contact Address: tkelly@mad.com

Location: 53701-1497 — 48

Personalized Report Profile

Select Activities — 50

Fishing ☐
Golf ☑
Skiing ☐
Windsurfing ☐
Other ☐ — 61

FIG. 3

Hi Matt! Happy Thursday, March 30, 2000 — 72

The forecast today is for cloudy skies, with a high of 66° at 3:00 P.M..

74 → Rain will begin at about 4:17 P.M., and will end at 10:18 P.M., you'll receive .16 inches.

76

80

78

- All the best for a great day!

Bob Lindmeier

P.S. Tonight I have a "special" on how to golf in high winds.

FIG. 5

SYSTEM AND METHOD FOR PROVIDING PERSONALIZED WEATHER REPORTS AND THE LIKE

FIELD OF THE INVENTION

The present invention pertains generally to systems and methods for producing weather reports including current weather conditions and weather forecasts, and, more particularly, to systems and methods for providing such weather reports and forecasts to individuals, e.g., over computer networks such as the internet.

BACKGROUND OF THE INVENTION

Most of the current weather and weather forecast information used by individuals is obtained by them from weather reports provided by local television and radio stations. Such reports are typically prepared by meteorologists at a television or radio station serving a particular geographical area, e.g., a large city and surrounding environs. The reports are based on current weather information available to the meteorologist which may be provided by various local (e.g., local radar) and national (e.g., NEXRAD radar and weather satellite) weather information sources. A meteorologist may also employ computer implemented weather forecasting models in preparing a weather forecast report. A meteorologist may prepare and/or update several such reports throughout the day, and such reports may be provided as part of periodic radio and/or television broadcasts. Such weather reports and forecasts may also be provided in printed form, e.g., in a daily newspaper. A person who is interested in the current or forecast weather conditions for a geographic location accesses such a weather report by tuning in to the television or radio broadcast of the report at the designated time, reading the paper, etc. If severe weather threatens a particular area, an emergency radio or television broadcast may be made to provide such information to the public immediately, and, if necessary, continuously. For example, a television station may provide a graphic indication of the general location (e.g., county) and nature of severe weather, (e.g., tornado, and thunderstorm warnings, etc.) as part of its television broadcast, throughout the period during which severe weather threatens an area.

A severe limitation of such conventional weather reports and forecasts is that they are generalized over a large geographic area and, typically, an extensive period of time. For example, a typical conventional weather forecast will provide predicted high and low temperatures, sky conditions, precipitation, etc., for the day, or for several days, for a particular geographical area, e.g., the city where the television or radio station is located and the surrounding area. However, the actual current and forecast weather conditions for the downtown area of a city, the suburbs, and surrounding rural areas will, of course, be different. For example, different areas in and around the city will achieve different high and low temperatures at different times during the day, and precipitation will reach different points in a television station's viewing area at different times during the day and at different levels of intensity. A meteorologist's forecast may indicate that some areas within a television station's viewing area will receive significant precipitation during the day, while other areas will receive none (e.g., a forecast of "widely scattered showers"). Thus, generalized weather conditions and forecasts for a particular area, e.g., a television or radio station viewing and/or listening area, may be of limited use to any particular individual, especially individuals living or working outside of a central city area, in that such general information will not provide an accurate indication of, e.g., high and low temperatures and sky conditions at any particular time during the day at that individual's home or place of work, and when, how much, or even if precipitation will arrive at that individual's home or place of work.

The National Weather Service also issues weather forecasts. However, such forecasts are "zone" forecasts generalized over National Weather Service "zones" which may cover a hundred miles square or more. Thus, such National Weather Service forecasts also do not provide an individual with a detailed or accurate weather forecast for a particular localized area of interest.

Advances in computer connectivity technology have allowed television and radio station meteorologists to provide access to their latest weather condition and forecast reports via computer over the internet at any time desired. Thus, an individual need not try to catch the local television or radio broadcast of a weather report to get the latest weather information. An individual may be able to access weather reports and other outdoor information for both local and remote geographic locations via computer over the internet. For example, U.S. Pat. No. 5,654,886 to Zereski, Jr., et al. describes a multimedia outdoor system which automatically compiles outdoor information, including current weather conditions, traffic, meteorologist-provided weather forecasts, etc., from a variety of sources and locations, and generates multimedia presentations based on the information for local areas throughout the country. In such a system, weather forecasts, including oral forecast presentations, are manually generated by meteorologists and entered into the system periodically. The multimedia reports generated by the system from such forecasts are stored in a presentation database. An interested user may access the weather report for a local area, such as a city, by accessing the presentation database via computer over, e.g., the internet. However, the individual weather reports and forecasts upon which the multimedia weather reports provided over the internet are based are conventional weather reports and forecasts which are generalized over a wide geographic area and period in time, as described above. Thus, such a system does not provide an individual with a detailed or accurate weather report and forecast for that individual's particular residence or place of work.

U.S. Pat. No. 6,018,699, to Baron, Sr., et al. describes a weather alert manager which receives meteorological data, e.g., NEXRAD data, which includes weather information defining storms within a relevant geographic area. The current position and predicted path of a storm is determined from the data and combined with a geographical grid to produce a storm profile indicating storm severity and if a storm is or is likely to enter any geographical grid area. The storm profile may be distributed to remote units located within a particular grid area to provide storm warnings to individuals in such areas. For example, the remote unit may be a cellular phone or pager which is associated with a particular area, and which receives the storm profile to provide the appropriate warning when a storm is in or approaching that area. Such a system, however, only provides limited severe weather warning information for existing storm cells and does not provide an individual with a detailed and accurate weather report and forecast of general weather conditions, e.g., high and low temperatures, precipitation, wind speed and direction, etc., for that individual's particular residence or place of work.

U.S. Pat. No. 6,023,223 to Baxter, Jr. describes a plurality of remotely located environmental sensors, e.g., temperature sensors, which are linked to a database server having data tables for holding the environmental data. A user can access the database, via the internet, to search for environmental information of interest. The user may also store a profile on the server which contains predefined environmental threshold triggers. When an environmental condition meets the threshold trigger, the user may be notified, e.g., via e-mail, facsimile message, pager, or telephone. Such a system, however, only provides a warning to a user if current conditions satisfy preselected thresholds and only provides limited environmental information for an individual's particular area of interest if an environmental sensor happens to be positioned in that area.

Complex weather forecasting models exist which can be used to generate accurate and detailed weather forecast data for narrowly defined geographic locations and periods in time. An example of such a weather forecasting model is the ADONIS model, available from Weather Central, Inc., of Madison, Wis. This model is based on a three-dimensional weather forecasting model of the atmosphere developed originally by Colorado State University and the University of Wisconsin. This model is a non-hydrostatic model, which therefore takes into account changing atmospheric moisture conditions, as well as topography, snow cover, etc., in generating weather forecast data. The model is, therefore, highly accurate. Some weather forecasting models, including ADONIS, are capable of producing weather forecast data with both high geographic and temporal resolution. For example, the ADONIS model may be run to provide detailed forecast data (e.g., temperature, sky conditions, wind, precipitation, etc., for, e.g., up to 25 different vertical levels of the atmosphere) for geographical areas only a few miles across and in half hour increments extending several days into the future. By extrapolation between such closely spaced points for which weather forecast model data is generated, accurate forecast weather conditions for any modeled time at any point in a modeled geographic area may be obtained. A practical limitation of such highly accurate and complex models is, however, the computation resources and time required to obtain such high resolution forecast data. As a practical matter, using current technology, the computation resources and time required to run such a model to generate high resolution forecast data for the entire country would be prohibitive for any single local television or radio station weather operation. In addition, to be useful, such highly detailed models must be capable of producing thousands of near-real-time individualized weather forecasts in order to be useful to individuals requiring precise pinpoint forecasts.

SUMMARY OF THE INVENTION

The present invention provides a system and method for generating weather reports and the like which are precisely computed automatically for a particular individual user's geographic location, e.g., home or work, and which are provided automatically directly to the individual user. The present invention may also provide personalized advanced notice to a user when forecast weather conditions meet a user definable weather condition profile for outdoor activities of interest to the user. In accordance with the present invention, a user establishes an individualized user profile in which the user defines a particular location of interest (e.g., home or work), a contact address (e.g., e-mail address or pager number) to which the personalized weather report is to be delivered, and, optionally, a personalized activity weather condition profile, establishing a preferred weather condition profile for activities of interest. A detailed and accurate weather forecasting model is run to provide high geographical and temporal resolution forecast data. This high resolution forecast data is compared to the individual user profile and a personalized weather report for the particular location, times, and conditions of interest to the individual is provided directly to the individual, e.g., via e-mail. The generation of individual personalized weather reports from pre-established user profile information and model forecast data may be generated and delivered automatically, without human intervention, e.g., each time the forecast model is run.

An exemplary system for providing personalized weather reports in accordance with the present invention includes a main computer system, which may be implemented, for example, as part of a television or radio station news and weather reporting operation. The main system computer includes weather forecast modeling software for calculating and presenting high geographical and temporal resolution forecast data for a wide, but limited, geographical area, e.g., the geographical area serviced by a television or radio station or newspaper. The weather forecasting model preferably accepts and stores as inputs thereto initialized weather model data, e.g., initial atmospheric condition information, which is generated and provided from a central location to the local main computer system (e.g., by satellite or internet data delivery). Since weather conditions modeled in the main computer are for a geographic area which is limited to, e.g., the television station's viewing area and the number of personalized weather reports generated and delivered by the main computer system is limited by the number of customers in a limited geographic area, computation resources and run-times for even very high resolution modeling and report generation are reasonable. The forecast model may be run periodically, e.g., twice a day, or each time initialization conditions are received by the main computer, to provide high resolution forecast data and personalized reports for the geographical area of interest.

The main computer system includes a user profile generator. The user profile generator provides various user profile set-up menu user interfaces which allow a user to establish a user profile. These menus may be accessed by a user by use of, for example, a personal computer connected to the main system computer over a network such as the internet. Using such menus, a user establishes a personal user profile which includes a particular location of interest, e.g., home, vacation home, or work, for which the user would like a detailed weather report, a contact address, e.g., e-mail address or pager number, to which the personalized weather report is to be delivered and, optionally, a personalized activity weather condition profile, establishing a preferred weather condition profile for activities of interest to the user. This user profile information is stored in a user profile database.

Each time the high resolution forecast model is run, the resulting forecast data is compared to the user profiles saved in the user profile database and personalized weather reports are generated automatically by a personalized report generator implemented in the main computer system. Automated detailed personalized report generation is possible using a high resolution weather forecast model, such as ADONIS, which provides as an output exact and discreet weather condition readings for specific points in time at pinpoint lat./lon. locations covering an entire geographic area of interest. The user location provided in the user profile may be converted to a lat./lon. coordinate and used to automatically pull detailed forecast weather conditions for that location from the forecast model data to generate the personalized weather report. The personalized weather reports are delivered to the user at the contact address indicated in the user profile, and include detailed information on forecast weather conditions, e.g., high and low temperatures, the times those temperatures will be reached, sky conditions, wind conditions, whether or not there will be frost or dew, etc., for the specific user location identified by the user in the user profile. The forecast data is also compared to the personalized activity weather condition profile established by the user, and, if forecast weather conditions satisfy the profile, a notice is sent to the user indicating that and when such favorable weather conditions for the activity will occur at a selected activity location (which may be different for the user's home or work location).

Further objects, features, and advantages of the invention will be apparent from the following detailed description taken in conjunction with the accompanying drawings.

BRIEF DESCRIPTION OF THE DRAWINGS

In the drawings:

FIG. 3 is an exemplary user profile set-up menu user interface for use in a system and method for providing personalized weather reports in accordance with the present invention.

FIG. 5 is an exemplary personalized e-mail weather report provided in accordance with the present invention.

DETAILED DESCRIPTION OF THE INVENTION

Figure 1:
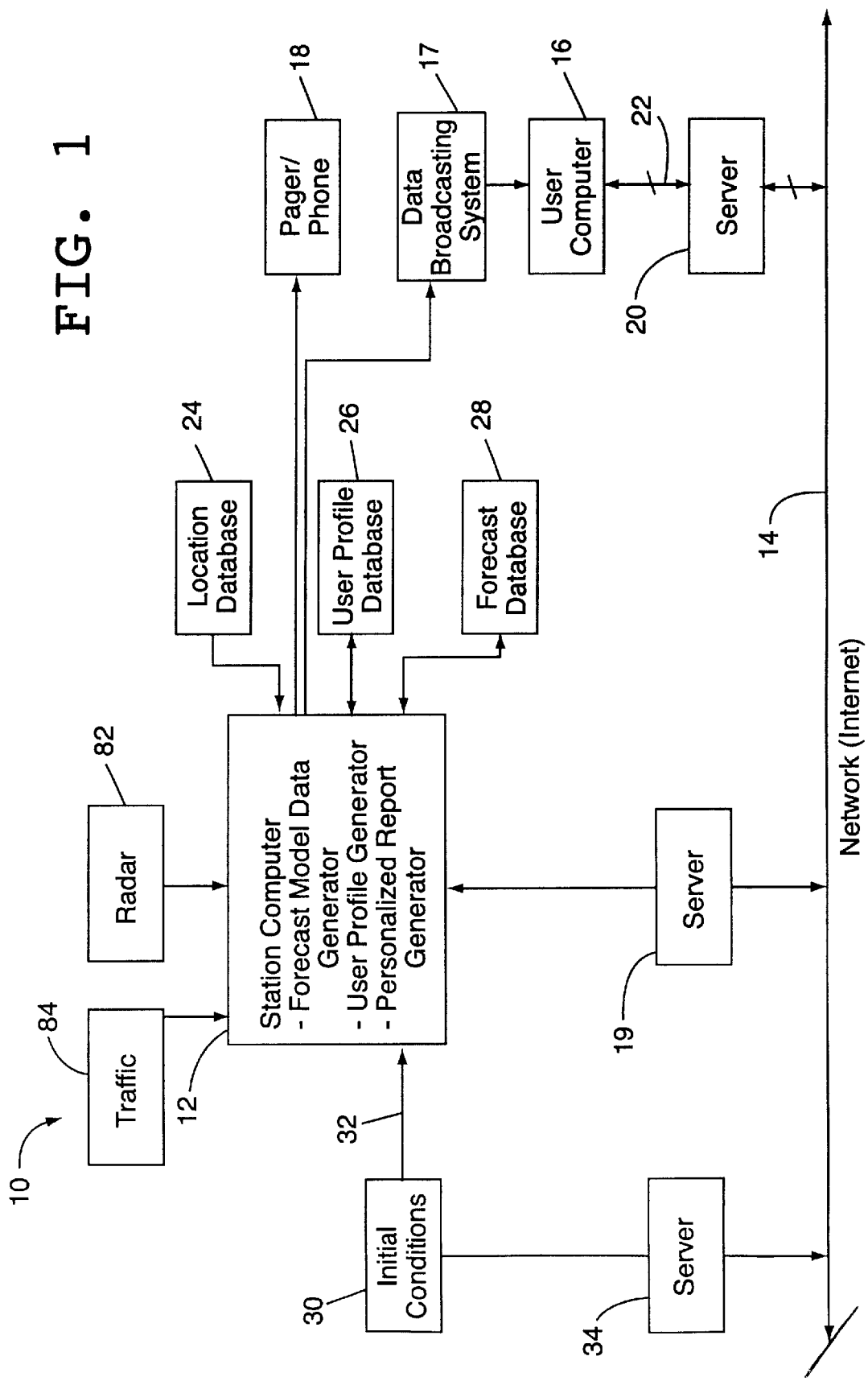
FIG. 1 is a schematic block diagram of an exemplary system for providing personalized weather reports in accordance with the present invention.

A schematic block diagram of an exemplary system 10 for providing personalized weather reports in accordance with the present invention is illustrated in, and will be described in detail with reference to, FIG. 1. In accordance with the present invention, personalized weather reports, and the like, are generated by a main computer system 12 which communicates, e.g., via a network connection 14 with a user's computer 16. The main computer system 12 may be implemented as one or more conventional computers located at a television or radio station or newspaper which services a particular geographic area of the country. The user's computer 16 may be implemented in a conventional manner as a personal or handheld wireless computer, Web TV terminal, digital television system, or the like. Two-way communications between the main computer system 12 and the user's computer 16 may be provided over any suitable communications network or link 14. Alternatively, communications between the main computer 12 and the user's computer 16 may be via any known or future data broadcasting system 17. The main computer 12 may also be in communication with a user's alphanumeric pager or cellular or other telephone 18, for providing personalized weather reports to the user thereby, as will be discussed in more detail below.

Preferably, and conveniently, the main computer system 12 and the user's computer 16 may communicate with each other via the internet 14, using conventional and widely known internet communications formats, protocols, etc. The main computer system 12 and user's computer 16 may be connected to the internet 14 in a conventional manner via servers 19 and 20, respectively. Note that the server 19 providing an internet connection for the main computer system 12 may be separate from or an integral part of the main computer system 12. The server 20 providing an internet connection for the user computer 16 may typically be provided by a commercial internet service provider. Communications between the user's computer 16 and the internet service provider's server 20 may typically be accomplished using a modem connection for communication over conventional telephone lines, cable television lines, or other physical or radio links 22. It should be understood that the central computer system 12 may provide personalized weather reports to many user computers 16 connected to the main computer system 12 over the internet 14. For example, a single internet service provider's server 20 may provide a connection to the central computer 12 over the internet 14 for many user computers 16, and an essentially unlimited number of servers 20 may be on the internet 14.

As mentioned above, the main computer system 12 may be implemented in a conventional manner using a single computer or multiple computers networked together to perform the functions required. The main computer system 12 may include conventional computer peripheral devices (not shown), including input and output devices such as keyboards, mouses, monitors, printers, etc. The main computer system 12 will also include conventional computer memory devices, including disk or tape storage devices for storing the computer programs which will be run on the main computer system 12 to implement a method for providing personalized weather reports and the like in accordance with the present invention. Memory, e.g., disk storage space, etc., is also provided for the storage of databases of information which is employed by the programs running on the main computer system 12 for generating personalized weather reports and the like. Such databases include a geographic location database 24, a user profile database 26, and a weather forecast database 28. The use of each of these databases 24, 26, and 28 in generating a personalized weather report in accordance with the present invention will be described in detail below. It should be noted that information in each database 24, 26, and 28 may be stored in its own memory device, e.g., disk, or together on the same disk or other memory device.

In accordance with the present invention, the main computer system 12 is programmed, using conventional programming techniques, to perform various functions to provide personalized weather reports to users. Such functions to be performed by the main computer 12 include a weather forecast model data generator function, a user profile generator function, and a personalized report generator function. Each of these functions will be described in more detail below.

Any conventional commercially available weather forecasting model may be employed in the main computer system 12 to implement the weather forecast model data generator function. Such models typically generate modeled weather forecast data based on atmospheric condition initialization data. Preferably, the weather forecasting model employed is capable of providing highly detailed and accurate weather forecasts of various weather parameters of interest, e.g., temperature, sky conditions, winds, precipitation, etc., with a high degree of both geographical and temporal resolution. An example of such a preferred weather forecasting model is the ADONIS model, available from Weather Central, Inc., of Madison, Wis. As discussed above, this non-hydrostatic model is capable of providing accurate and detailed forecast weather parameters for geographical areas a few miles across at half-hour increments for at least 120 half-hour periods into the future. (The degree of geographic and temporal resolution is user adjustable, and may be provided over longer or shorter time periods.) Based on calculated forecast weather parameters for discrete closely spaced points in a geographic area, the model automatically and accurately extrapolates forecast weather conditions for any lat./lon. coordinate within the modeled area.

As discussed above, detailed and accurate weather forecasting models require powerful and expensive computer resources and significant processing time to provide high geographic and temporal resolution weather forecast data. For a single conventional computer system, at a single location, to provide such data for the entire country would take a prohibitively long period of time. The problem of computation resources and run times is exacerbated when one considers the need also to automatically generate personalized weather reports from modeled forecast data, and to delivery of such reports to users throughout the country. However, such high resolution forecast data is required to provide the accurate personalized weather reports for particular locations (residence or place of work) of interest which users require. In accordance with the present invention, a single computer system 12 need not model such detailed and high resolution forecast data for the entire country. Rather, the computer system 12 need only provide high resolution forecast data (and generate and deliver personalized weather reports based thereon) for a wide, but limited, geographic area served by, e.g., the television or radio station or newspaper. For example, the weather forecasting model run on the television or radio station's main computer system 12 may provide detailed and high resolution weather forecast data only for the geographical viewing or listening area served by the station. Thus, the television or radio station can provide personalized weather reports to viewers or listeners in its service area without the need for unreasonable computer resources or computation times.

An exemplary weather forecasting model which may be employed by a television or radio station to generate detailed and high resolution weather forecast data for the particular geographical area served by the station is the commercially available ADONIS Microcast weather forecast modeling product available from Weather Central, Inc., of Madison, Wis. This product is capable of providing the same high geographic and temporal resolution weather forecast data produced by ADONIS, as described above, for a wide, but limited geographical area using reasonable computation resources and computation times. This model employs initial atmospheric condition data 30 which is computed at a central location from "raw" observational data provided by the National Weather Service and other agencies. The initialization data 30 is provided periodically, e.g., twice a day, from the central location to the main computer system 12. The initial conditions 30 may be provided to the main computer system 12 running the weather forecasting model via a direct communication link 32 (e.g., a satellite link) or, alternatively, via the internet 14, via a server 34, in either case using conventional data transfer protocols.

Figure 2:
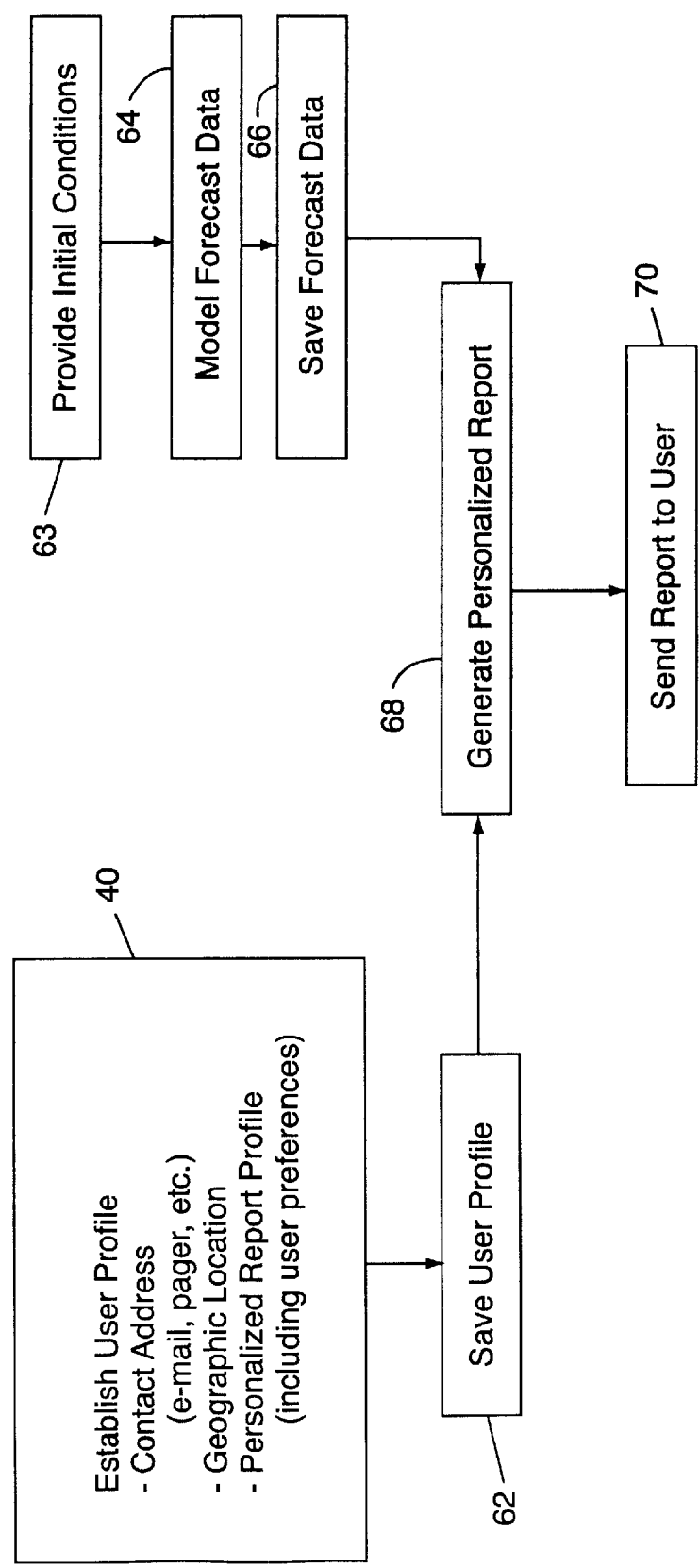
FIG. 2 is a schematic flowchart diagram of an exemplary method for providing personalized weather reports in accordance with the present invention.

An exemplary method, employing the system 10 described with reference to FIG. 1, for providing personalized weather reports and the like to a user will now be described in detail with reference to the exemplary flowchart diagram of FIG. 2. The process of providing a personalized weather report to a user begins with the establishment of a user profile 40. The user profile may be established by each user himself. For example, a user may establish a user profile by connecting with the main computer system 12 over, e.g., the internet 14. The user profile generator function, running on the main computer system 12, may preferably provide a user profile set-up menu user interface as a web page which may be accessed by the user over the internet. An exemplary, and very simplified, user profile set-up menu user interface is illustrated at 42 in FIG. 3. The user profile set-up menu user interface 42 prompts a user to provide a name 44, contact address 46, and location identification 48. (The user profile set-up menu user interface 42 may also prompt the user to provide other information, e.g., billing, e.g., credit card, information for billing the cost of personalized weather reports to the user, in a conventional manner. The page on which the user profile set-up menu user interface is provided may also include advertisements and hypertext links to other web pages or sites on the internet, in a conventional manner.) The contact address 46 is the address to which the user would like his personalized weather reports to be sent. This may be, for example, an internet e-mail address, for providing the personalized reports to the user's computer 16 over the internet 14, or may identify another destination or medium for transmitting the reports to a user. For example, personalized weather reports may be provided by the main computer system 12 to a user's alphanumeric pager or cellular phone 18 (e.g., using a conventional voice synthesizer) (see FIG. 1), in which case the contact address may be a cell phone or pager number. The location 48 is the geographical location for which the user is interested in receiving a detailed weather report. For example, the location may be the user's home or work location. Various methods may be used for identifying the desired location. For example, the user may provide a street address or a United States Postal Service zip+4 code, either of which will identify the location of interest with sufficient detail. Since the weather forecast model run on the main computer system 12 will typically produce weather forecast data for geographic locations identified by lat./lon. coordinates, it will typically be necessary to convert the location 48 entered by the user in the user profile set-up menu user interface 42 into a lat./lon. coordinate. For this purpose, the main computer system 12 may employ a geographic location database 24, which may include a table or other data structure for converting street addresses, zip+4 codes, etc. to corresponding lat./lon. coordinates.

Figure 4:
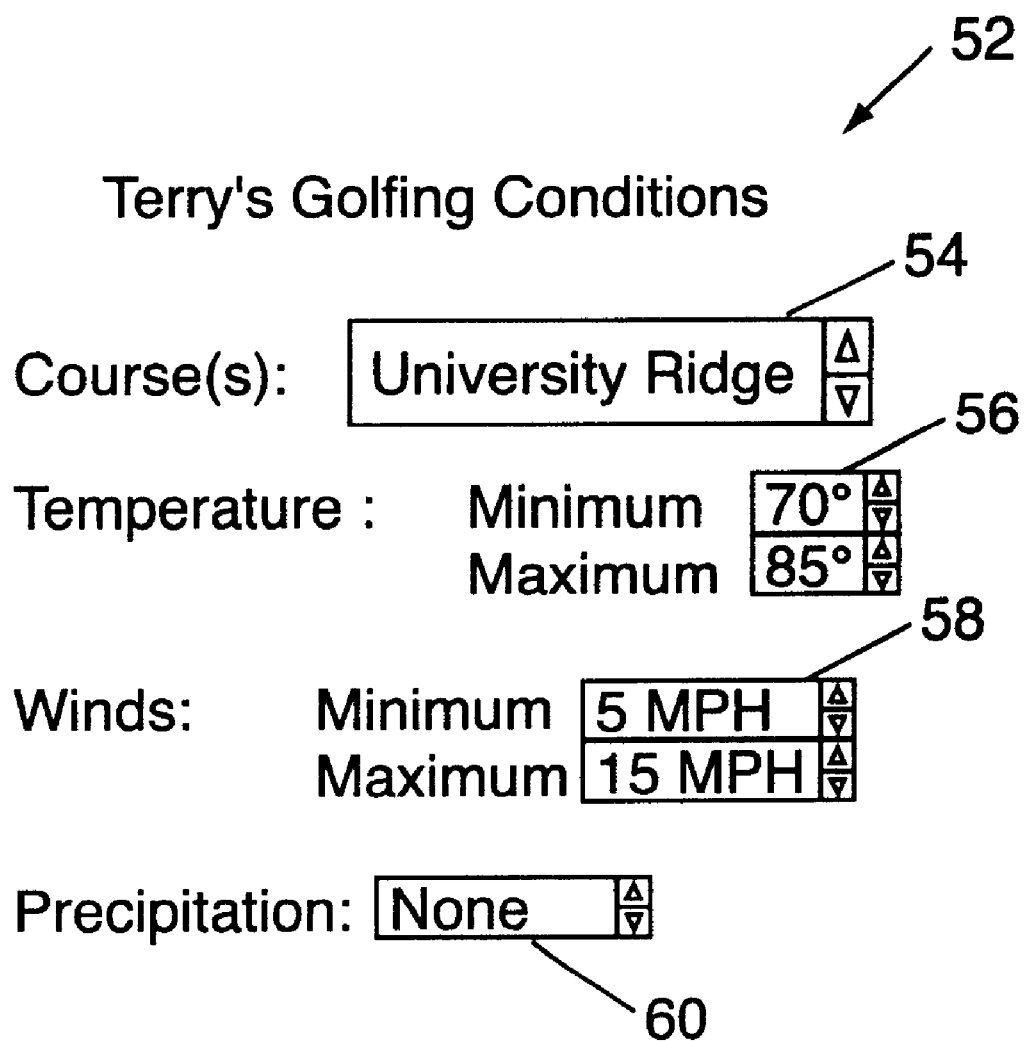
FIG. 4 is an exemplary outdoor activity weather condition profile set-up menu user interface for use in a system and method for providing personalized weather reports in accordance with the present invention.

Preferably, a user may also be prompted to identify outdoor or other activities in which the user is interested and for which the user would like advance notice of favorable (or unfavorable) weather conditions. The user may be provided with a predefined list 50 of typical outdoor activities or weather conditions from which to select. Having selected one or more activities from the activity list 50, the user may be provided an activity weather condition profile menu user interface by the user profile generator. In the activity weather condition profile menu user interface, the user is prompted to select a desired location or locations for performing an activity and preferred weather conditions at that location. An exemplary user activity weather condition profile set-up menu for a user interested in golf, for example, is illustrated at 52 in FIG. 4. As illustrated, this menu prompts a user to select a golf course or courses at which the user is interested in playing 54, minimum and maximum temperatures at which the user would be willing to play golf 56, minimum and maximum acceptable wind speeds 58, and whether or not the user is interested in playing golf if there is any precipitation 60. Of course, the user may be prompted to provide different or other conditions than those illustrated by example in FIG. 4. The profile weather conditions which a user may be prompted to select may depend on the activity of interest for which a weather condition profile is to be generated. The activity weather condition profile user interface may provide default values for some or all of the conditions, based on, e.g., weather conditions for the activity which are preferred by most or typical participants in the activity, while providing an individual user the opportunity to override the default condition values to establish his or her own preferred weather condition profile. The geographical location database 24 preferably includes lat./lon. coordinates for activity locations, e.g., golf courses, lakes for fishing, beaches for wind surfing, etc., which may be selected by a user, such that the main computer system 12 may convert such locations to lat./lon. coordinates as discussed above. For activities for which a user desires to receive advance notice of favorable (or unfavorable) conditions, but which are not listed in the predefined selected activities list 50 on the user profile set-up menu user interface 42, the user may select "other" 61, in response to which, for example, the user may be provided with a weather conditions profile set-up menu user interface allowing the user to select a location and ranges of conditions for each condition modeled by the weather forecast model to establish a personalized activity weather condition profile.

Having established a user profile, using the user profile set-up 42 and related user interface menus, the user profile is saved 62 by the main computer system 12, e.g., in a user profile database 26. Of course, many individual user profiles may be established by individual users and saved by the main computer system 12 in the user profile database 26. A user is preferably able to change any user definable portion of his user profile at any time by re-accessing the user profile set-up menu user interface 42, e.g., over the internet connection 14, and making any desired changes. For security purposes, a user may be requested to establish a user password upon initially establishing a user profile, and may be prompted to enter this password before being allowed to make any changes to a previously established user profile.

Periodically, e.g., twice a day, the main computer system 12 runs 64 the weather forecasting model, as described above, to provide detailed accurate high resolution weather forecast data. As discussed above, depending upon the model employed, the weather forecast model may require initial conditions 30 to be provided thereto 63. For example, initial conditions may be provided to the computer system 12, e.g., twice a day, from a remote central location, and the weather forecast model run 64 each time the initial conditions are provided. The resulting detailed high resolution weather forecast model data is saved by the main computer system 12 into a forecast database 28 at 66. As discussed above, the detailed weather forecast data includes detailed weather condition information, e.g., temperatures, sky conditions, winds, precipitation, etc., for specific geographic locations (preferably no more than a few miles apart) and with a high degree of temporal resolution (e.g., for half-hour increments) extending up to several days into the future.

The saved weather forecast data from the forecast database 28 is combined by the personalized report generator function in main computer system 12 with the user profile data in the user profile database 26 at 68 to generate a personalized weather report for each user who has established a user profile. The step 68 of generating a personalized weather report may be performed automatically, for example, each time the weather forecast model is run to generate weather forecast data. The personalized weather report is then delivered at 70 to the user at the contact address 46 provided by the user in the user profile set-up menu user interface 42. For example, the computer system 12 may include a personalized weather report generator which generates a personalized weather report in the form of a text e-mail message which is sent to the user periodically, e.g., twice a day.

An exemplary personalized weather report e-mail message 72 which may be generated and delivered to a user in this manner is shown in FIG. 5. Note that a personalized weather report e-mail message provided in accordance with the present invention may provide additional or different information, and may have a different format than the message 72 shown by example in FIG. 5. (Additionally, the personalized weather report e-mail message may include advertisements and hypertext links to web sites in a conventional manner.) The personalized weather report message 72 may be generated from a report form template. Individual condition values, e.g., temperatures, precipitation, times of occurrences, etc., are extracted by the personalized report generator function from the modeled forecast data and inserted into the proper position in the template to generate the personalized weather report 72. For example, a sentence template 74 may be provided for reporting forecast rain condition in the personalized report message 72. If the modeled forecast data indicates rain for the selected user location, the sentence template 74 is added to the message 72, with details on when the rain will start 76 and end 78 and how much rain will be received 80 at the location extracted from the weather model forecast data and inserted into the sentence template. (For very widely scattered "on-and-off" precipitation conditions, the user may be presented with a percentage likelihood of precipitation between specified times.) Other sentence templates may be employed in a similar manner for other weather conditions.

As discussed above, a personalized weather report in accordance with the present invention may be provided in other than a text format to a contact address other than a computer. For example, the personalized report may be provided as an oral report to a user's computer or telephone, using conventional voice synthesization technology. In addition to text, the personalized report may include still or animated graphics of weather conditions at the selected location. Such graphics may be generated in a conventional manner from the available weather forecast model data, and may be delivered as part of the personalized weather report or accessed from the weather report, e.g., by a hyperlink.

A personalized weather report in accordance with the present invention provides a detailed weather forecast for the location identified by the user in the user profile set-up menu, not merely a general forecast for a large geographic region which may incorporate that location. If the weather forecast model has not generated a set of forecast conditions for the exact lat./lon. corresponding to the location identified by the user, the computer system 12 may extrapolate conditions for the location from modeled conditions for nearly adjacent locations. Since the weather forecast model preferably provides high resolution forecast data for locations separated by no more than a few miles, such an extrapolation process should provide an accurate indication of forecast weather conditions at the location to the user.

If a user has established a weather condition profile for one or more activities, such profiles will be compared to the saved forecast data by the personalized weather report generator as part of the step of generating a personalized weather report. If forecast conditions for the indicated activity location satisfy the established profile, a personalized report, e.g., an e-mail message, which may be included as part of or separate from the personalized weather report 72, is sent to the user to provide advance notice to the user of when and where the favorable conditions are to occur.

In addition to providing advanced weather forecast information, the personalized weather report may provide current weather condition information, severe weather warning reports, and other information for the indicated location to a user at the user's contact address. Such reports and warnings may be generated automatically based, e.g., on current weather condition information, provided, e.g., by local and/or remote weather radar systems 82, which is provided to the main computer system 12 (see FIG. 1). Other information, such as traffic information, may also be provided automatically as part of the personalized report based, e.g., on traffic information 84 provided to the main computer system 12.

It should be understood that the present invention is not limited to the particular embodiments and examples illustrated and described herein, but embraces all such modified forms thereof as come within the scope of the following claims. For example, even though it is preferred that personalized weather reports in accordance with the present invention be generated by computers located at local radio or television stations, etc., for their local region of interest, based on locally generated model data and initialization conditions only provided from a central location, a central system may be used to provide detailed personalized weather reports for users throughout the country if sufficient computer resources are available at a central site.

What is claimed is:

1. A method for generating a personalized weather report, comprising the steps of:
    (a) establishing a user profile including a user defined user location and a user contact address;
    (b) generating forecast weather condition data for an area including the user location;
    (c) generating a personalized weather forecast and weather report of forecast weather conditions at the user location automatically from the user profile and the forecast weather condition data; and
    (d) delivering the personalized weather report to the user contact address.

2. The method of claim 1 wherein the step of establishing a user profile includes the step of providing a user profile set-up menu user interface.

3. The method of claim 1 wherein the user contact address is an e-mail address, the step of generating a personalized weather report includes the step of generating a personalized weather report e-mail message, and the step of delivering the personalized weather report includes the step of sending the personalized weather report e-mail message to the user contact e-mail address.

4. The method of claim 1 wherein the step of generating forecast weather condition data includes the step of running a weather forecast model to generate weather forecast model data for an area including the user location.

5. The method of claim 4 wherein the step of generating a personalized weather forecast and weather report includes the step of extrapolating weather conditions for the user location from the weather forecast model data.

6. The method of claim 4 wherein the step of generating forecast weather condition data includes the step of receiving periodically atmosphere initialization conditions for a weather forecast model from a remote location.

7. The method of claim 6 wherein the steps of generating forecast weather condition data, generating a personalized weather forecast and weather report, and delivering the personalized weather report are performed periodically each time the atmosphere initialization conditions are received from the remote location.

8. The method of claim 1 comprising the additional steps of:
    (a) establishing a user weather condition profile including weather condition profile values;
    (b) comparing the forecast weather condition data with the weather condition profile values;
    (c) generating a report indicating that the weather condition profile will be satisfied if the forecast weather condition data satisfy the weather condition profile values; and
    (d) delivering the report to the user contact address.

9. The method of claim 8 wherein the step of establishing a user weather condition profile includes the step of providing a user weather condition profile setup menu user interface.

10. The method of claim 8 wherein the step of establishing a user weather condition profile includes the step of selecting an activity location, wherein the step of generating forecast weather condition data includes the step of generating forecast weather condition data for the selected activity location, wherein the step of comparing the forecast weather condition data includes the step of comparing the forecast weather condition data for the selected activity location with the weather condition profile values, and wherein the step of generating the report includes the step of generating the report if the forecast weather condition data for the selected activity location satisfy the weather condition profile values.

11. A method for generating a personalized weather report, comprising the steps of:
    (a) establishing a user profile including a user defined location of interest;
    (b) generating forecast weather condition data for an area including the location of interest;
    (c) generating a weather forecast and weather report of forecast weather conditions at the location of interest automatically from the user profile and the forecast weather condition data; and
    (d) providing the weather report to a user.

12. The method of claim 11 wherein the step of establishing a user profile includes the step of providing a user profile set-up menu user interface.

13. The method of claim 11 wherein the step of providing the weather report to a user includes the step of providing the weather report to an addressable device.

14. The method of claim 11 wherein the step of establishing a user profile includes the step of establishing a user contact address and wherein the step of providing the weather report to a user includes the step of delivering the weather report to the user contact address.

15. The method of claim 14 wherein the user contact address is an e-mail address, the step of generating a weather report includes the step of generating a weather report e-mail message, and the step of delivering the weather report includes the step of sending the weather report e-mail message to the user contact e-mail address.

16. The method of claim 14 wherein the user contact address is a phone number, the step of generating a weather report includes the step of generating a weather report voice message, and the step of delivering the weather report includes the step of sending the weather report voice message to a phone at the user contact phone number.

17. The method of claim 14 wherein the user contact address is a pager number, the step of generating a weather report includes the step of generating a weather report text message, and the step of delivering the weather report includes the step of sending the weather report text message to a pager at the user contact pager number.

18. The method of claim 11 wherein the step of generating forecast weather condition data includes the step of running a weather forecast model to generate weather forecast model data for an area including the location of interest.

19. The method of claim 18 wherein the step of generating a weather forecast and weather report includes the step of extrapolating weather conditions for the location of interest from the weather forecast model data.

20. The method of claim 18 wherein the step of generating forecast weather condition data includes the step of receiving periodic atmospheric initialization conditions for a weather forecast model from a remote location.

21. The method of claim 20 wherein the steps of generating forecast weather condition data, generating a weather forecast and weather report, and providing the weather report are performed periodically each time the atmospheric initialization conditions are received from the remote location.

22. The method of claim 11 comprising the additional steps of:
   (a) establishing a user weather condition profile including weather condition profile values;
   (b) comparing the forecast weather condition data with the weather condition profile values;
   (c) generating a weather condition profile report indicating whether the forecast weather condition data satisfy the weather condition profile values; and
   (d) providing the weather condition profile report to a user.

23. The method of claim 22 wherein the step of establishing a user weather condition profile includes the step of providing a user weather condition profile setup menu user interface.

24. The method of claim 22 wherein the step of establishing a user weather condition profile includes the step of selecting a profile location, wherein the step of generating forecast weather condition data includes the step of generating forecast weather condition data for an area including the selected profile location, wherein the step of comparing the forecast weather condition data includes the step of comparing the forecast weather condition data for the selected profile location with the weather condition profile values, and wherein the step of generating the weather condition profile report includes the step of generating the weather condition profile report if the forecast weather condition data for the selected activity location satisfy the weather condition profile values.

25. A method for generating a personalized weather report, comprising the steps of:
   (a) establishing a user profile including a user defined location of interest and weather condition profile values;
   (b) generating forecast weather condition data for an area including the location of interest;
   (c) comparing the forecast weather condition data at the, location of interest with the weather condition profile values;
   (d) generating a weather condition profile report indicating whether the forecast weather condition data satisfy the weather condition profile values; and
   (e) providing the weather condition profile report to a user.

26. The method of claim 25 wherein the step of establishing a user profile includes the step of providing a user profile set-up menu user interface including a weather condition profile set-up menu user interface.

27. The method of claim 26 wherein the user profile set-up menu user interface includes a user selectable list of activities and selected weather conditions for each activity.

28. The method of claim 27 wherein the user profile set-up menu user interface includes user overrideable default weather condition profile values for the selected weather conditions.

29. The method of claim 25 wherein the step of providing the weather condition profile report to a user includes the step of providing the weather condition profile report to an addressable device.

30. The method of claim 25 wherein the step of establishing a user profile includes the step of establishing a user contact address and wherein the step of providing the weather condition profile report to a user includes the step of delivering the weather condition profile report to the user contact address.

31. The method of claim 30 wherein the user contact address is an e-mail address, the step of generating a weather condition profile report includes the step of generating a weather condition profile report e-mail message, and the step of delivering the weather condition profile report includes the step of sending the weather condition profile report e-mail message to the user contact e-mail address.

32. The method of claim 30 wherein the user contact address is a phone number, the step of generating a weather condition profile report includes the step of generating a weather condition profile report voice message, and the step of delivering the weather condition profile report includes the step of sending the weather condition profile report voice message to a phone at the user contact phone number.

33. The method of claim 30 wherein the user contact address is a pager number, the step of generating a weather condition profile report includes the step of generating a weather condition profile report text message, and the step of delivering the weather condition profile report includes the step of sending the weather condition profile report text message to a pager at the user contact pager number.

34. The method of claim 25 wherein the step of generating forecast weather condition data includes the step of running a weather forecast model to generate weather forecast model data for an area including the location of interest.

35. The method of claim 34 wherein the step of generating a weather condition profile report includes the step of extrapolating weather conditions for the location of interest from the weather forecast model data.

36. The method of claim 34 wherein the step of generating forecast weather condition data includes the step of receiving periodically atmospheric initialization conditions for a weather forecast model from a remote location.

37. The method of claim 36 wherein the steps of generating forecast weather condition data, generating a weather condition profile report, and providing the weather condition profile report are performed periodically each time the atmospheric initialization conditions are received from the remote location.

38. The method of claim 25 wherein the step of generating the weather condition profile report includes the step of generating the report if the forecast weather condition data for the location of interest satisfy the weather condition profile values.

39. A personalized weather report generating system, comprising:
  (a) a user profile generator for generating a user profile including a user defined location of interest;
  (b) a weather forecast model data generator for generating weather forecast model data for an area including the location of interest; and
  (c) a weather report generator for generating a weather forecast and a report of forecast weather conditions at the location of interest automatically from the user profile and the weather forecast model data.

40. The personalized weather report generating system of claim 39 wherein the user profile generator, the weather forecast model data generator, and the weather report generator are implemented in at least one general purpose computer.

41. The personalized weather report generating system of claim 39 wherein user profile generator includes means for generating a user profile set-up menu user interface and for providing the user profile set-up menu user interface to a user.

42. The personalized weather report generating system of claim 41 wherein the means for providing the user profile set-up menu user interface to a user includes means for providing the user profile set-up menu user interface to a user over a computer network.

43. The personalized weather report generating system of claim 39 comprising additionally means for providing the weather report to an addressable device.

44. The personalized weather report generating system of claim 39 comprising additionally means for delivering the weather report to a user contact address.

45. The personalized weather report generating system of claim 44 wherein the user contact address is an e-mail address and the weather report generator is adapted to generate a weather report e-mail message.

46. The personalized weather report generating system of claim 44 wherein the user contact address is a phone number and the weather report generator is adapted to generate a weather report voice message.

47. The personalized weather report generating system of claim 44 wherein the user contact address is a pager number and the weather report generator is adapted to generate a weather report text message.

48. The personalized weather report generating system of claim 39 wherein the weather report generator is adapted to extrapolate weather conditions for the location of interest from the weather forecast model data.

49. The personalized weather report generating system of claim 39 wherein the weather forecast model data generator includes a weather forecasting model which generates the weather forecast model data from atmospheric initialization conditions.

50. The personalized weather report generating system of claim 39 wherein the user profile generator is adapted to generate a user weather condition profile including weather condition profile values, and wherein the weather report generator is adapted to compare the weather forecast model data with the weather condition profile values and to generate a weather condition profile report indicating whether the weather forecast model data satisfies the weather condition-profile values.

* * * * *